United States Patent
Hadzic (10) Patent No.: US 7,130,303 B2
(45) Date of Patent: Oct. 31, 2006

(54) ETHERNET PACKET ENCAPSULATION FOR METROPOLITAN AREA ETHERNET NETWORKS

(75) Inventor: Ilija Hadzic, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 772 days.

(21) Appl. No.: 09/809,526

(22) Filed: Mar. 15, 2001

(65) Prior Publication Data

US 2002/0131414 A1  Sep. 19, 2002

(51) Int. Cl.
*H04L 12/28* (2006.01)
*H04J 3/24* (2006.01)

(52) U.S. Cl. ...................... 370/389; 370/474

(58) Field of Classification Search ........... 370/300, 370/389, 392, 393, 400, 474, 475, 352–356
See application file for complete search history.

(56) References Cited

U.S. PATENT DOCUMENTS

| 5,742,604 | A | * | 4/1998 | Edsall et al. ............... 370/401 |
| 5,790,541 | A | * | 8/1998 | Patrick et al. .............. 370/392 |
| 5,815,501 | A | * | 9/1998 | Gaddis et al. .............. 370/402 |
| 5,959,990 | A | * | 9/1999 | Frantz et al. ............... 370/392 |
| 6,181,699 | B1 | * | 1/2001 | Crinion et al. ............. 370/392 |
| 6,490,280 | B1 | * | 12/2002 | Leung ....................... 370/392 |
| 6,570,875 | B1 | * | 5/2003 | Hegde ....................... 370/389 |
| 6,584,122 | B1 | * | 6/2003 | Matthews et al. .......... 370/493 |
| 6,603,769 | B1 | * | 8/2003 | Thubert et al. ............. 370/401 |
| 6,618,388 | B1 | * | 9/2003 | Yip et al. ................... 370/401 |
| 6,735,198 | B1 | * | 5/2004 | Edsall et al. ............... 370/389 |
| 6,760,776 | B1 | * | 7/2004 | Gallo et al. ................ 709/238 |
| 6,807,172 | B1 | * | 10/2004 | Levenson et al. ......... 370/389 |
| 2002/0110087 | A1 | * | 8/2002 | Zelig et al. ................. 370/236 |

OTHER PUBLICATIONS

W. Simpson, "IP in IP Tunneling", http://www.ietf.org/rfc/rfc1853.txt, pp. 1-8, Oct. 1995.
R. Atkinson, "IP Encapsulating Security Payload (ESP)", http://www.ietf.org/rfc/rfc2406.txt, p. 1-21, Nov. 1998.
H. Peng et al., http://www.ieee802.org/rprsg/public/presentations/nov2000/ipt_header.pdf.

* cited by examiner

*Primary Examiner*—Chau Nguyen
*Assistant Examiner*—Hong Sol Cho
(74) *Attorney, Agent, or Firm*—Eugene J. Rosenthal (57) ABSTRACT

The problems of large tables in Ethernet switches used on a metropolitan area scale, and the exposure of the enterprise network topologies, can be avoided by encapsulating each original Ethernet packet, which originates in a first network of an entity, e.g., an enterprise, a customer, or a network service provider, within another Ethernet packet which is given a source address that identifies the new encapsulating packet as originating at a port of a switch that is located at the interface between the first network in which the original packet originated and a second Ethernet network, e.g., the metropolitan area Ethernet network, which is to transport the encapsulating packet. When the encapsulating packet would exceed the allowable Ethernet packet length, the original packet may be split up at the interface between the first and second network and the resulting parts encapsulated into two encapsulating packets.

36 Claims, 10 Drawing Sheets

| INNER ADDRESS | OUTER ADDRESS | TIME STAMP |
|---|---|---|
| A | 0 | |
| ... | ... | ... |

803-1 · 805-1 · 807-1

801-2

| INNER ADDRESS | OUTER ADDRESS | TIME STAMP |
|---|---|---|
| B | 1 | |
| C | 1 | |
| D | 2 | |
| ... | ... | ... |

803-2 · 805-2 · 807-2

801-N

| INNER ADDRESS | OUTER ADDRESS | TIME STAMP |
|---|---|---|
| E | 3 | |
| A | 4 | |
| ... | ... | ... |

ETHERNET PACKET ENCAPSULATION FOR METROPOLITAN AREA ETHERNET NETWORKS

TECHNICAL FIELD

This invention relates to the art of Ethernet networks, and more particularly, to Ethernet networks that are employed for communication on a metropolitan area scale.

BACKGROUND OF THE INVENTION

Ethernet switches contain a table that maps Ethernet addresses to the ports of the switch via which communication with those Ethernet addresses takes place. When a packet arrives at the switch, the switch searches its table to determine via which port the packet must be transmitted.

As more and more Ethernet addresses are served by the same switch, the size of the table must grow accordingly. With Ethernet networks on the scale of a metropolitan area network, the tables of each switch become very large. As a result, the table is difficult to search, in that it requires either complex circuitry to enable it to be searched quickly, e.g., in real time, or else the chances of packets being dropped by the switch increases due to delays in searching the table. Also, such switches require large amounts of memory to store the tables, which makes the switches more costly and physically larger as well.

Furthermore, the use of such tables forces a service provider, i.e., a provider of transport via a metropolitan area Ethernet network, to deal with information relating to the network topology, e.g., the number and configuration of workstations, of the various enterprise networks for which the service provider is providing metropolitan area Ethernet service. Although not likely, this information may be abused by the service provider.

SUMMARY OF THE INVENTION

I have recognized that the foregoing problems of large tables in Ethernet switches used on a metropolitan area scale, and the exposure of the enterprise network topologies, can be avoided by encapsulating contents of each original Ethernet packet, which originates in a first Ethernet network of an entity, e.g., an enterprise, a customer, or a network service provider, within another Ethernet packet which is given a source address that identifies the new encapsulating packet as originating at a port of a switch that is located at the interface between the first Ethernet network in which the original Ethernet packet originated and a second Ethernet network, e.g., the metropolitan area Ethernet network, which is to transport the encapsulating packet. Furthermore, in the event the switch of the metropolitan area Ethernet network that serves the destination is not known to the switch of the metropolitan area Ethernet network at which the encapsulating packet originates, an indicator of the entity which originated the original Ethernet packet may be included in the encapsulating packet to enable the encapsulating packet to be appropriately relayed through the metropolitan area Ethernet network and eventually reach the switch of the metropolitan area Ethernet network that serves the destination. Thus, advantageously, transparent connectivity among different sites of the same entity is achieved, and yet full isolation of the traffic generated by different entities is maintained in a more efficient manner than is possible with prior art arrangements.

The contents encapsulated in a single encapsulating packet may be the entirety of the original Ethernet packet. However, in the event that the encapsulating packet would exceed the allowable Ethernet packet length should it include the entire original Ethernet packet, the contents of the original Ethernet packet may be split up at the interface between the first and second network and the resulting content parts encapsulated into two encapsulating packets. The original Ethernet packet is reconstituted when the two encapsulating packets complete transiting the second network and reach their far end interface between the second and first networks. In one embodiment of the invention, additional information may be inserted into each encapsulating packet so as to enable switches at the interface between the first and second network to reconstitute each original Ethernet packet whether it was split up or not.

In one embodiment of the invention, broadcast and multicast packets from the first network are converted into multicast packets in the second network. This may be achieved a) by broadcasting a packet into a virtual local area network (VLAN) or b) using the standard native Ethernet multicasting within the second network.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, read-only memory (ROM) for storing software, random access memory (RAM), application specific integrated circuit (ASIC), field programmable gate array (FPGA), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

Software modules, or simply modules which are implied to be software, may be represented herein as any combination of flowchart elements or other elements indicating performance of process steps and/or textual description. Such modules may be executed by hardware which is expressly or implicitly shown.

As used herein, the term "Ethernet" includes what is commonly referred to in the art as Ethernet as well as the Institute of Electrical and Electronic Engineers (IEEE) 802.1 standard. Thus, included within the term Ethernet is 10 Base 2, also known as thin coax Ethernet which is sometimes referred to as cheapnet; 10 Base 5, also known as thick coax Ethernet; 10 Base T also known as twisted pair Ethernet; 100 Base T, 100 Base F, 100 base TX, and 100 Base T4 which are all referred to as Fast Ethernet; 1000 Base F which is gigabit Ethernet, e.g., over fiber; 10G Ethernet; and the like. Furthermore, the Ethernet may be of the switched or not switched.

Figure 1:
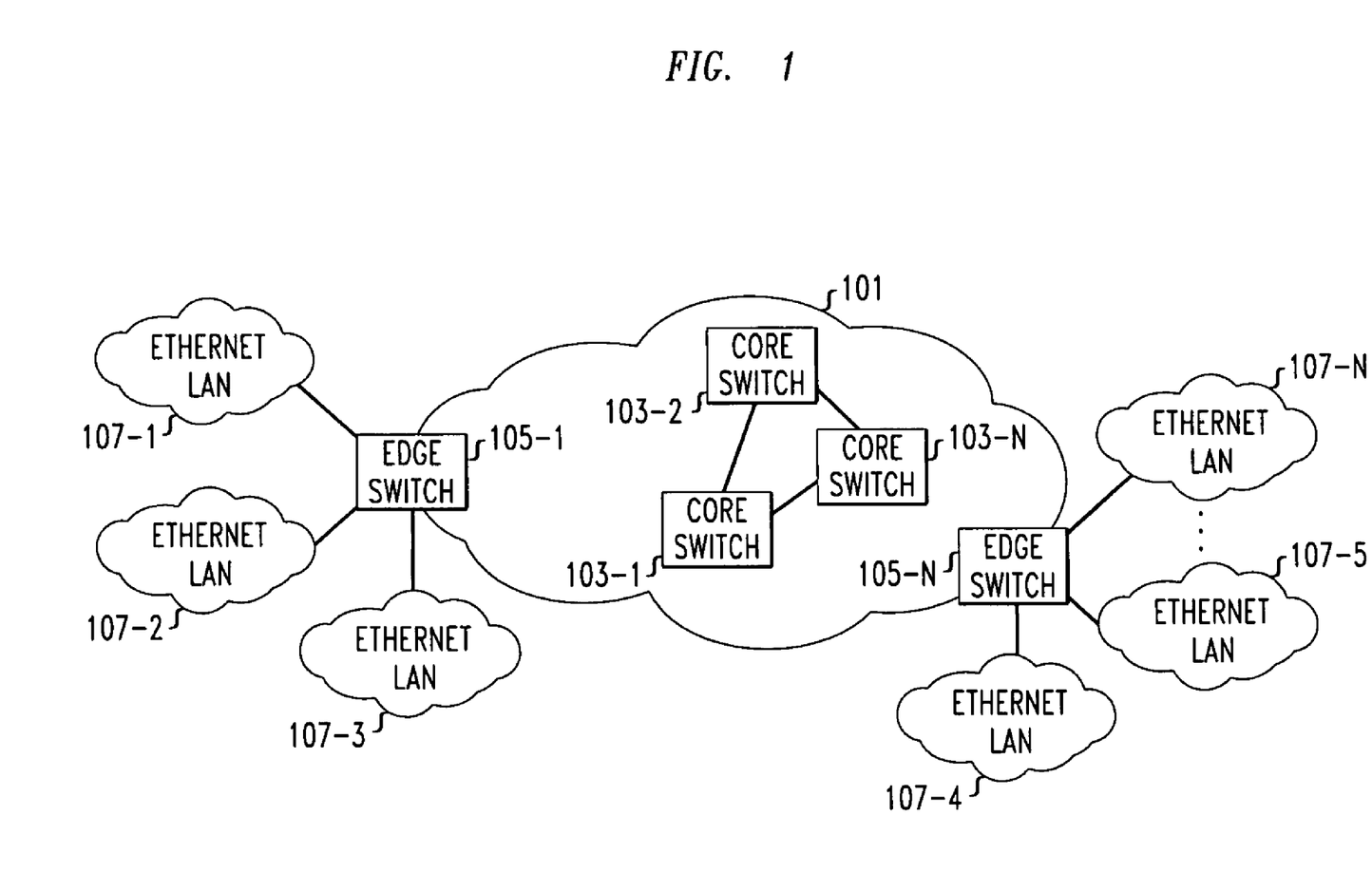
FIG. 1 shows an overall public Ethernet network arranged in accordance with the principles of the invention to provide Ethernet service on a metropolitan scale.

FIG. 1 shows an overall public Ethernet network arranged in accordance with the principles of the invention that provides Ethernet service on a metropolitan scale. Shown in FIG. 1 are metropolitan Ethernet network 101, including core switches 103 and edge switches 105, as well as Ethernet local area networks (LAN) 107.

Each of LANs 107 is a conventional Ethernet LAN each belonging to a single entity. Thus, each of LANs 107 may be, for example, an enterprise network, a customer network, or any other provider network. Furthermore, more than one of LANs 107 may belong to a single entity, and in fact they may be different sites or portions of the overall network for that entity. As is well known, each of LANs 107 may include various conventional elements such as workstations, servers, hubs, switches, routers, or the like.

Metropolitan Ethernet network 101 is arranged to serve the various ones of LANs 107 in accordance with the principles of the invention, so that transparent connectivity is provided among the ones of LANs 107 that represent various sites of each respective entity, while maintaining full isolation of the traffic generated by the different respective entities from each other. To this end, core switches 103 of metropolitan Ethernet network 101 are conventional Ethernet switches. However, edge switches 105 of metropolitan Ethernet network 101, are arranged to encapsulate each original Ethernet packet originating in one of LANs 107 into a new Ethernet packet which has a source address that indicates that the new packet originates at a particular port of the one of edge switches 107 that is coupled to the one of LANs 107 in which the original packet originated. Effectively, in accordance with an aspect of the invention, the new packet is identified as originating from the one of LANs 107 from which it originated, but without specifying which particular source of that one of LANs 107 originated it.

The destination address of the encapsulating packet may be handled in one of several ways. If the one of edge switches 105 which is creating the encapsulating packet is aware of the port of the one of edge switches 105 that serves the destination specified by the packet being encapsulated, then the address of such port is employed as the destination address. However, if the one of edge switches 105 which is creating the encapsulating packet is unaware of the port of the one of edge switches 105 that serves the destination specified by the packet being encapsulated, then it is required that the encapsulating packet reach at least each of edge switches 105 that are serving the entity to which the encapsulating packet is addressed. This may be implemented by the edge switch marking the encapsulating packet with an indication of the entity originating the encapsulated packet, e.g., by placing an indication of the entity in the virtual-LAN (VLAN) field of the encapsulating packet, and then employing within metropolitan area Ethernet 101 conventional Ethernet operations such as broadcast within the VLAN or Ethernet multicasting.

Each port of each one edge switches 110 that is directly connected to one of LANs 107 is considered local to the one of edge switches 105 in which it exists, while each port of each one edge switches 105 that is not directly connected to one of LANs 107 is considered remote with respect to the one of edge switches 105 in which it exists. Initially, each of edge switches 105 is aware of the particular entity which each of its local ports serves. As encapsulating packets pass through metropolitan area Ethernet 101, conventional Ethernet network self-learning and address aging takes place so that core switches 103 and edge switches 105 associate various Ethernet addresses of encapsulating packets with ports of core switches 103 and edge switches 105.

Additionally, in accordance with an aspect of the invention, edge switches 105 associate addresses of encapsulated packets with the addresses of local and remote edge switch ports. Thus, the encapsulating packets are able to reach the appropriate edge switch, and from there be transmitted to the proper one of LANs 107. Note that prior to serving an entity it may be necessary to initially configure, e.g., manually or using some remote management system, such as simple network management protocol (SNMP), each edge switch so that it is aware of which of its ports serves such entity. In a manner analogous to, and for the same reason as, the aging of conventional Ethernet addresses, the association of addresses of encapsulated packets with local and remote edge switch ports is also aged in the edge switches.

A packet received by one of edge switches 105 from a one of core switches 103 is processed in an inverse manner. More specifically, the edge switch supplies the encapsulated packet to the appropriate one of its ports. A port is appropriate if it is the port specifically identified by the encapsulating packet's destination address or the encapsulating packet is a broadcast packet and the port is one that belongs to the entity to which the packet is being broadcast. In order to supply the encapsulated packet to the appropriate port, all the information added by the encapsulating process is stripped away. In accordance with an aspect of the invention, the receiving one of edge switches 105 also associates the source address of the encapsulated packet with the source address of the encapsulating packet. The receiving edge switch is then able to know for the future that an encapsulating packet which encapsulates a packet destined for the received encapsulated packet source address should employ as its destination address the source address of the metropolitan area network that was associated therewith.

In the event that a received encapsulating packet contains only part of an encapsulated packet, i.e., the encapsulated packet was fragmented, and that encapsulated packet needs to be transmitted to at least one port of the edge switch, the edge switch will wait until it has reassembled the entire packet before supplying it to the appropriate port. However, if the remainder of the encapsulated packet is not received within a specified time window, the already received encapsulating packet will be dropped.

FIGS. 2, 3, 4, 5, 6, and 7 when connected together, show an exemplary method for processing packets in one of edge switches 105 (FIG. 1), and more particularly, a) how to process packets arriving from one of Ethernet LANs 107 for transport by metropolitan Ethernet network 101, which includes, if appropriate, only being transported by the one of edge switches 105 at which the packet arrives from one of LANs 107; and b) how to process packets arriving from metropolitan Ethernet network 101 that need to be transmitted to one of Ethernet LANs 107.

The process is entered in step 201 (FIG. 2) when a packet is received at an edge switch. At conditional branch 203 the edge switch tests to determine if the received packet is a valid Ethernet packet, e.g., by performing well-known standard tests. Note that the received packet can be either an unencapsulated packet, such as one originating from or destined for, after processing by an edge switch, one of Ethernet LANs 107, also referred to herein as a so-called "inner" packet or it could be an encapsulating packet from metropolitan Ethernet network 101, also referred to herein as a so-called "outer" packet. The checks for both types of packets are the same since, in accordance with an aspect of the invention, the encapsulating packets are arranged to be recognized as Ethernet packets. If the test result in step 203 is NO, indicating that the received packet is not valid, control passes to step 205 in which the packet is dropped. Thereafter, the process is exited in step 241.

Figure 2:
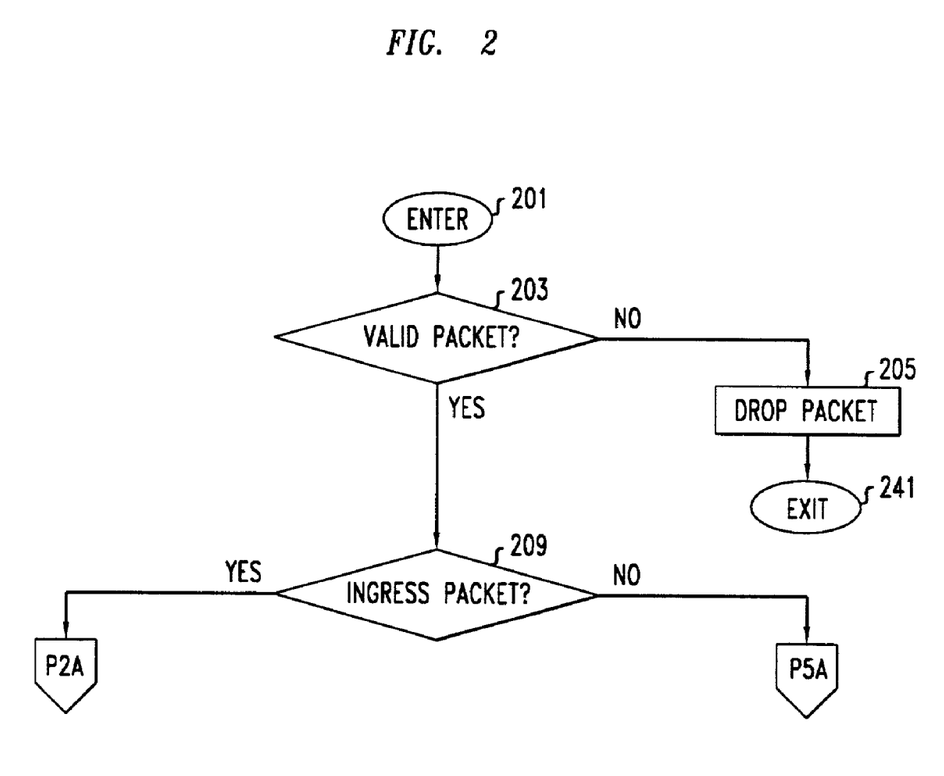
FIGS. 2, 3, 4, 5, 6, and 7, when connected together, show an exemplary method for processing packets in one of the edge switches of FIG. 1.
Figure 3:
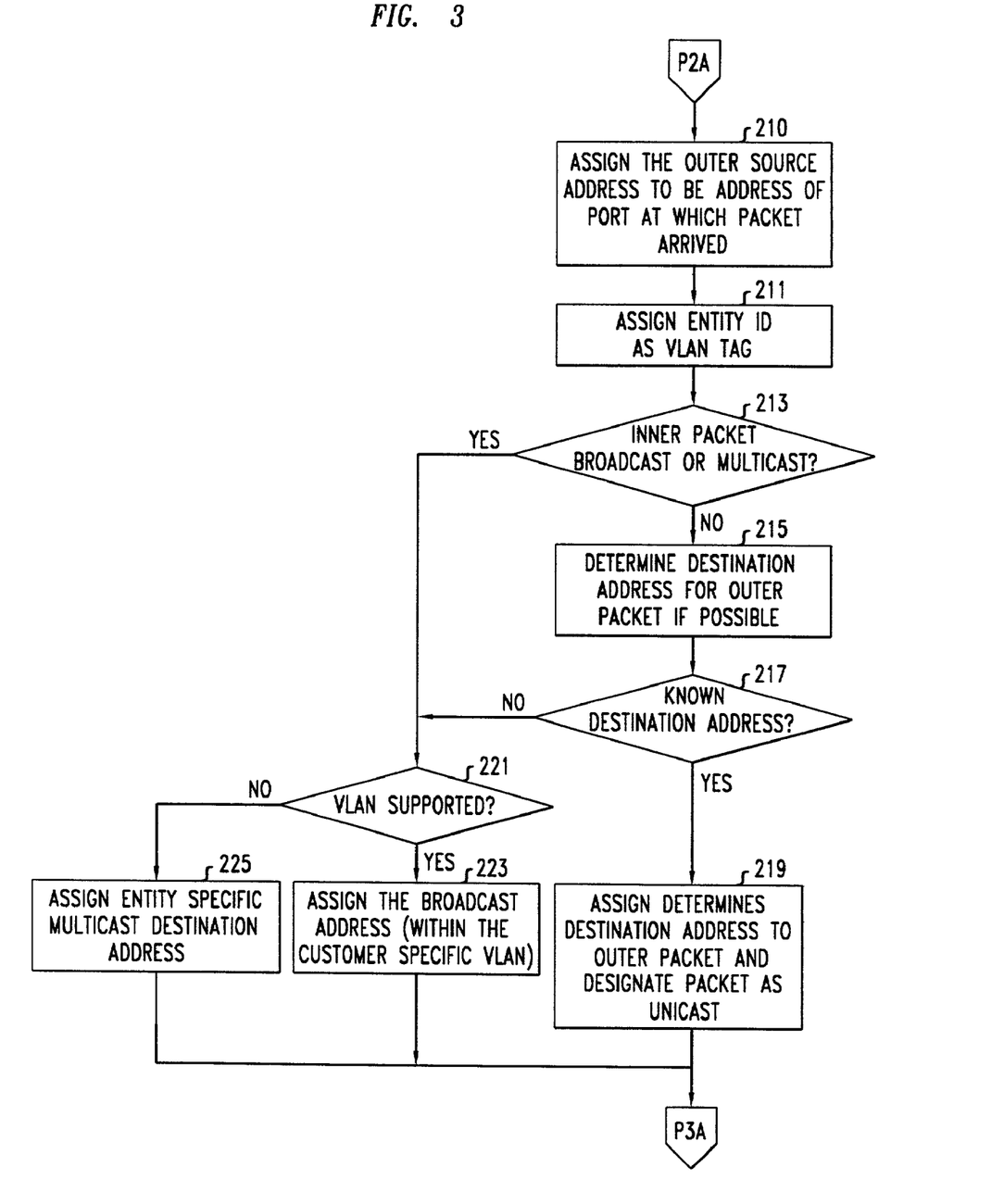
Figure 4:
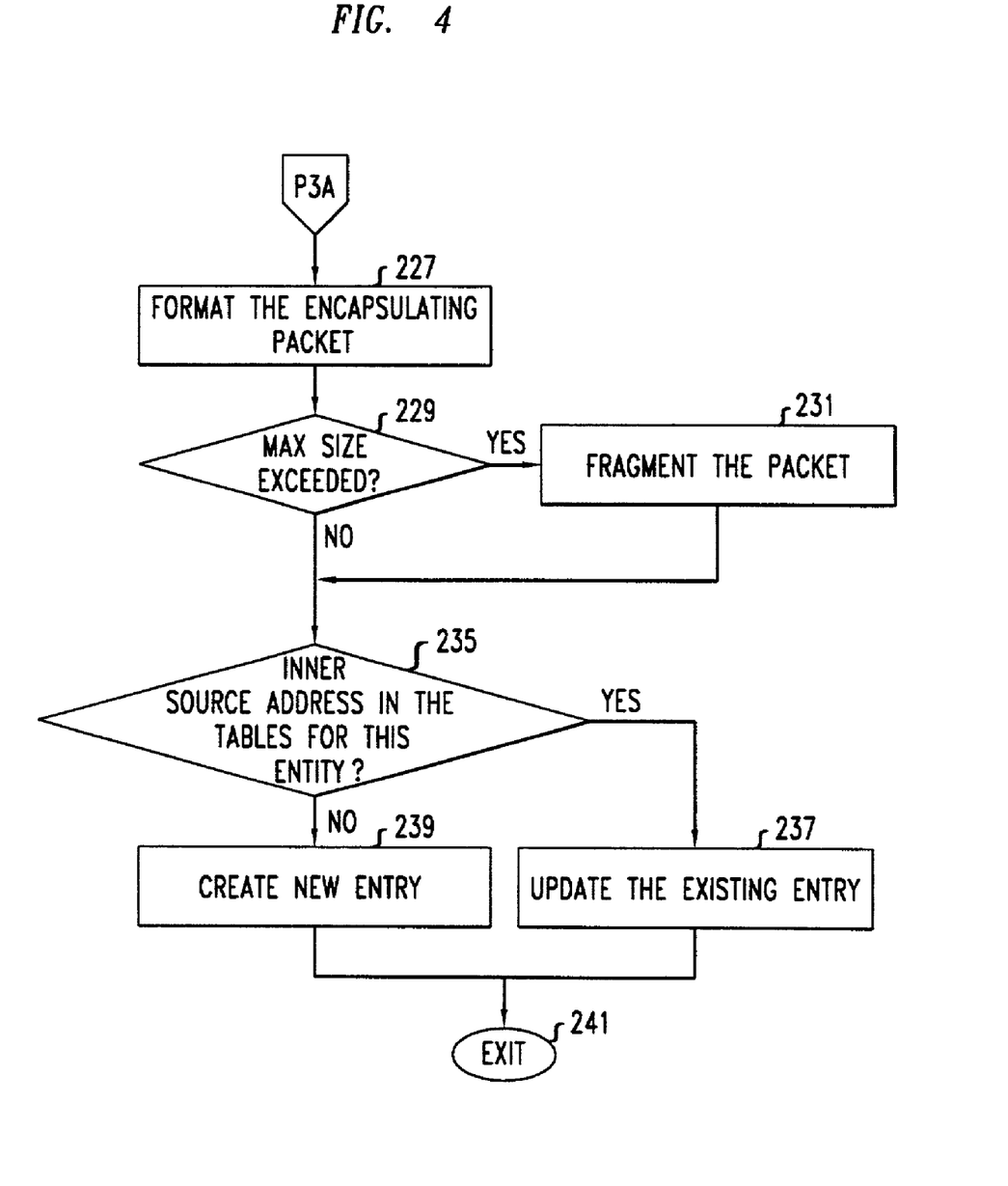
Figure 5:
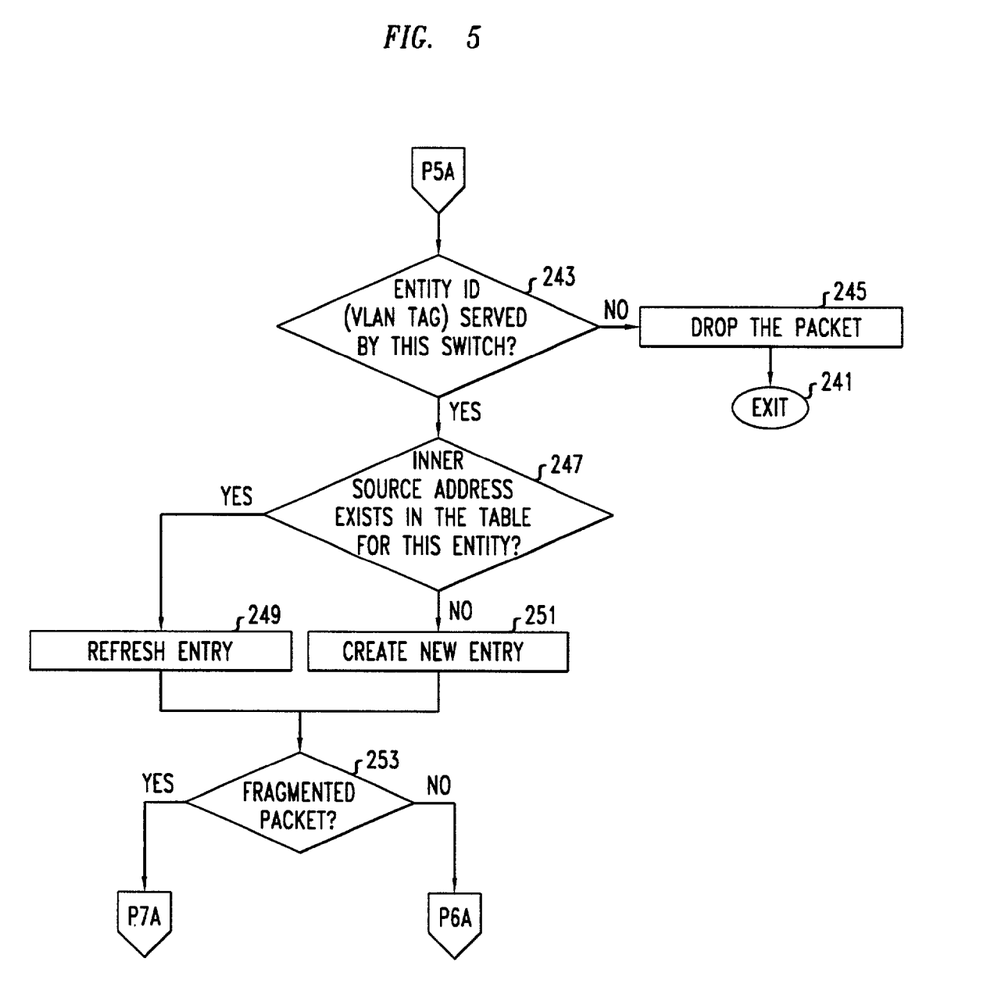
Figure 6:
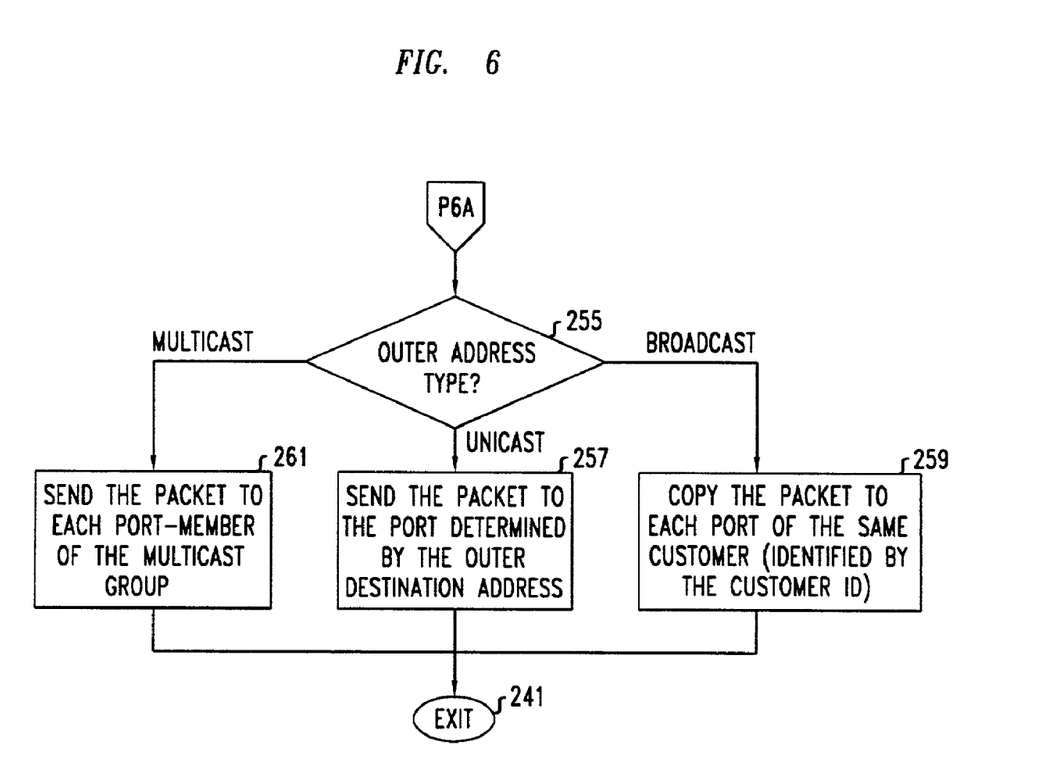
Figure 7:
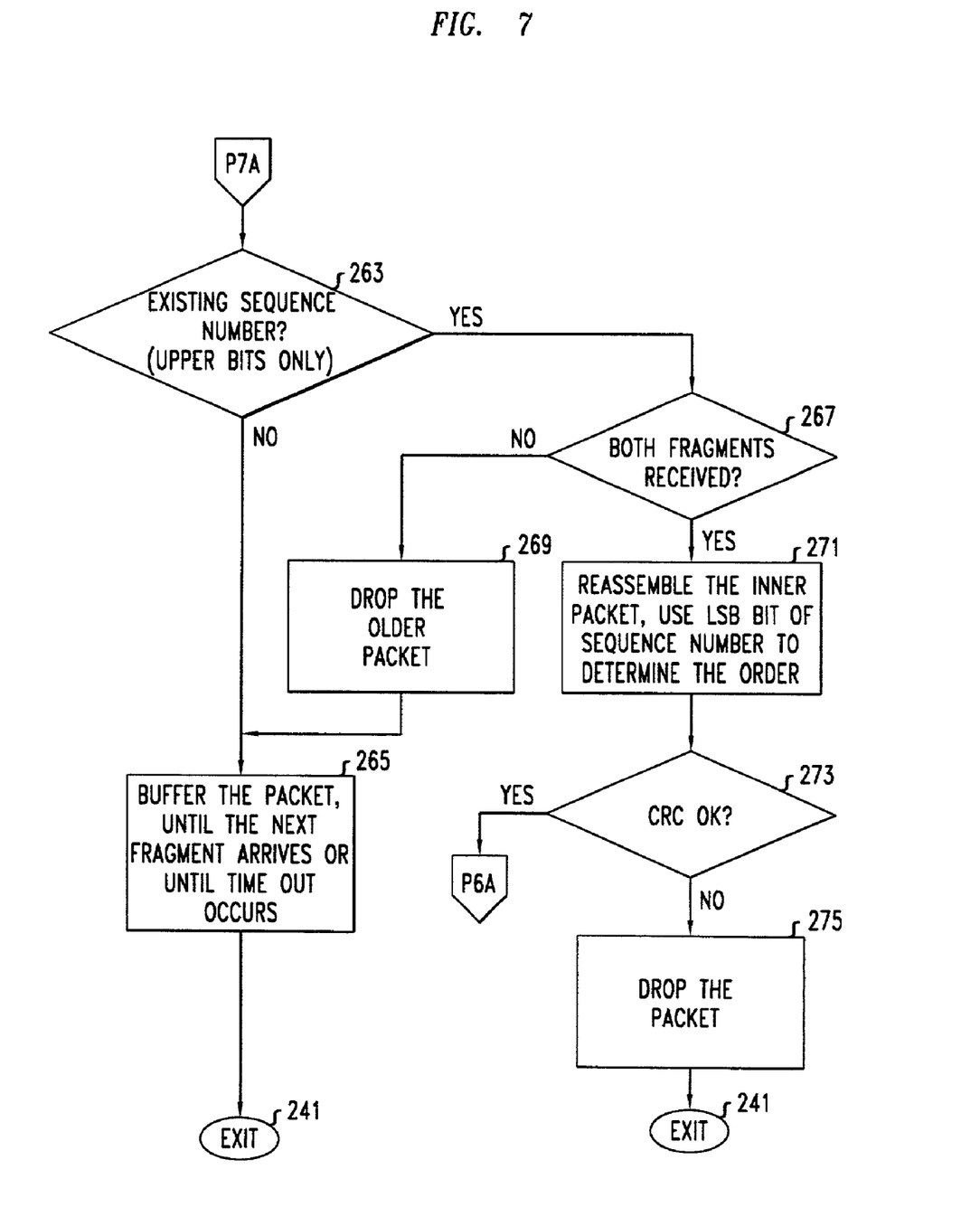

If the test result 203 is YES, indicating that the received packet is valid, control passes to step 209, which tests to determine if the packet is an ingress packet, i.e., a packet belonging to an ingress flow, which is the flow of packets originating at one of LANs 107 and is currently being transported to metropolitan Ethernet network 101. Packets that belong to an ingress flow are received as unencapsulated packets and are supplied to metropolitan Ethernet network 101 within encapsulating packets. Similarly, egress packet, i.e., a packet belonging to an egress flow, which is the flow of packets originating at metropolitan Ethernet network 101 and is currently being transported to one of LANs 107. Packets that belong to an egress flow are received as encapsulating packets and are supplied to one of LANs 107 as unencapsulated packets. Each edge switches 105 knows whether a packet is an ingress packet or an egress packet as a function of the port on which it arrives, since the edge switches are aware of whether a port is connected to a one of LANs 107 or a switch of metropolitan Ethernet network 101.

If the test result in step 209 is YES, indicating that the packet is an ingress packet, it is necessary to construct the header and trailer of the packet which will encapsulate the received ingress packet. These are known, respectively, as the outer header and outer trailer, as distinguished from the header and trailer of the packet as received which are known as the inner header and inner trailer, respectively. To this end, control passes to step 210, in which the address of the port at which the packet arrived is set as the source address of the outer header. Note that, in accordance with an aspect of the invention, the port address is an Ethernet address assigned to the port for purposes of the metropolitan area network. Furthermore, in accordance with an aspect of the invention, each port in the metropolitan area network has its own Ethernet address in the same manner that each workstation attached to one of LANs 107 has its own Ethernet address.

In step 211 the entity identification (ID) is assigned to be the VLAN tag for the outer header. Note that the entity ID is determined based on the port at which the packet arrived which has been previously administered to correspond to a particular entity.

Next, conditional branch point 213 tests to determine if the inner packet is a broadcast packet or a multicast packet. If the test result in step 213 is NO, indicating that the inner packet is neither a broadcast packet nor a multicast packet, but instead is a unicast packet, control passes to step 215 in which the edge switch uses the destination address of the inner packet to determine the corresponding outer packet destination address if it is known. Conditional branch point 217 tests to determine if there is a known corresponding outer packet destination address. If the test result in step 217 is YES, indicating that there is a known corresponding outer packet destination address, i.e., the one found in step 215, control passes to step 219, in which the known corresponding outer packet destination address is assigned as the outer destination address of the outer packet, which is indicated to be a unicast packet.

If the test result in step 213 is YES, indicating that the inner packet is a broadcast packet or a multicast packet, or if the test result in step 217 is NO, indicating that there is no known corresponding outer packet destination address for the destination address of the inner packet, control passes to conditional branch point 221, which tests to determine whether or not VLAN is supported by the metropolitan Ethernet Network, which is true if all the switches of metropolitan Ethernet network are VLAN capable. This is set in advance of the performance of the instant process via the performance of network administration by the provider of the metropolitan Ethernet network, who knows the capabilities of the switches that are in the metropolitan Ethernet network. If the test result in step 221 is YES, indicating that the switches of metropolitan Ethernet network are VLAN capable, control passes to step 223, in which the header of the outer packet is marked to indicate that the packet is a broadcast packet. The fact that VLAN is supported insures that only those of LANs 107 that belong to the entity of the VLAN entered in the header in step 211 will receive a copy of the packet.

If the test result in step 221 is NO, indicating that the switches of metropolitan Ethernet network are not VLAN capable, so that the VLAN tag entered in step 211 is going to be ignored by the switches of the metropolitan Ethernet network, control passes to step 225 in which an entity specific multicast destination address is employed as the destination address for the outer header. Note that although the switches of metropolitan Ethernet network are not VLAN capable, such switches will still be able to process packets that have had a VLAN tag set in their header, as was done in step 211, but the VLAN tag will simply be ignored. Each edge switch is administered in advance so that it knows the multicast destination address for each entity that it serves.

After steps 219, 223, or 225 control passes to step 227, in which completion of formatting of the encapsulating packet takes place. For example, a) the inner packet is placed in the payload field of the encapsulating packet, b) information regarding fragmentation of the encapsulating packet, which initially indicates the packet is not fragmented, is included in the packet, and c) a cyclic redundancy check (CRC) code is determined over the entire encapsulating packet and then placed in the CRC field of the encapsulating packet.

Figure 9:
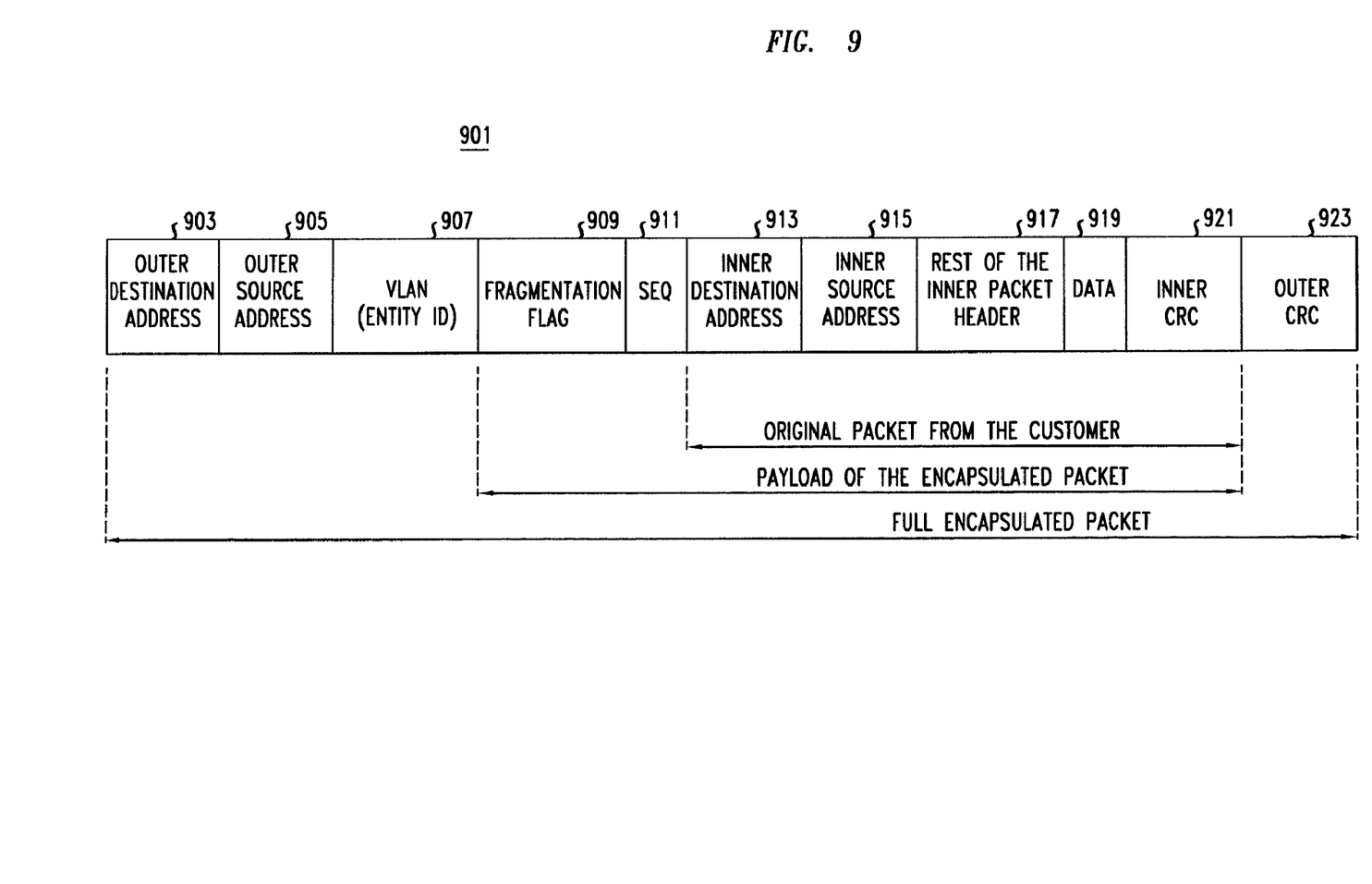
FIG. 9 shows an exemplary format for an encapsulating packet.

An exemplary format for an encapsulating packet is shown in FIG. 9. Shown are only the portions of interest. Those standard portions of the packet which are well known to those of ordinary skill in the art and are not of interest with respect to the invention have been omitted for clarity purposes. Encapsulating packet 901 includes outer destination address field 903, outer source address field 905, VLAN tag field 907, fragmentation flag 909, sequence number field 911, inner destination address field 913, inner source address 915, rest of the inner packet header field 917, data field 919, inner CRC field 921, and outer CRC field 923.

Thereafter, in accordance with an aspect of the invention, optional conditional branch point 229 tests to determine if the size of the encapsulating packet has exceeded the maximum length for an Ethernet packet according to the standard, and so the inner packet needs to be broken up and encapsulated within two or more packets, which is referred to as fragmentation. This step, and all the fragmentation related steps, are required in the event that conventional core switches are employed which handle packets having the maximum length for a standard Ethernet frame or a jumbo frame. However, if the core switches are adjusted so that they can handle frames that are slightly larger, i.e., large enough to include the extra header and CRC field of the encapsulating packet, then the fragmentation steps, as well as the fragmentation information in the encapsulating packet's header, are not required. If the test result in step 229 is YES, indicating that the encapsulating packet has exceeded the maximum allowable length, control passes to step 231, in which the packet is fragmented. This is achieved by removing from the end of the data section of the inner packet at least enough information so that the remaining outer packet is within the Ethernet size maximum length. The outer packet then has its fragmentation indicator set to indicate that the outer packet is part of a segmented packet pair, and a sequence number is placed in the sequence number field. The length of sequence number is long enough to accommodate a count large enough to account for the network delays and the fact that Ethernet permits packets to arrive out of order. This length must be set based on the actual network parameters such as propagation delay, queuing delay, and transmission delay, the time-out value after which the edge switch will drop the incomplete packet, and the allowable worst case traffic load for each entity site. Note that the fragmentation indicator and the sequence number may be combined, e.g., by employing a specific sequence number to indicate that the packet is not fragmented. A new CRC for the fragmented packet is computed and placed in the CRC field.

The removed information is placed in a new packet with the same outer packet header. The new outer packet then has its fragmentation indicator set to indicate that the outer packet is part of a segmented packet pair, and a sequence number is placed in the sequence number field. A new CRC for the fragmented packet is computed and placed in the CRC field. In accordance with an aspect of the invention, the inner packet's source and destination addresses can also be placed in the data field of the encapsulating packet. This is done to facilitate learning of the mapping of addresses and ports even if the first corresponding fragment of the inner packet is lost. Furthermore, repeating the inner packet's source and destination addresses allows the use of sequence numbers represented by fewer bits because the packets may be uniquely identified based on the inner and outer source and destination addresses and the sequence number rather than simply based on the sequence number alone. Thus, the sequence numbers employed at any time in the network need not be unique, because the inner and outer source and destination addresses differentiate packets with the same sequence number. However, the sequence numbers employed at any time in the network do need to be unique for any set of inner and outer source and destination addresses. Doing so allows the number of bits employed for the sequence numbers to remain constant even if metropolitan area network 101 grows in size.

In accordance with an aspect of the invention, the sequence numbers can be arranged so that even sequence numbers indicate the first fragment of an inner packet while odd sequence numbers indicate the second fragment of an inner packet, or vice-versa. Advantageously, only the least significant bit of a sequence number need be checked to determine if a packet was the first fragment or the second fragment, while all the other bits of the sequence number must be the same to determine that the two fragments belong to the same original inner packet.

In accordance with an aspect of the invention, the point at which an inner packet is fragmented may be selected so as to achieve a prescribed distribution of outer packet lengths. In one embodiment of the invention, the point at which the inner packet is fragmented is selected using a random number generator with the prescribed distribution. One such prescribed distribution may be a uniform distribution. Another prescribed distribution may be an exponential distribution. The advantage of being able to control the distribution may allow the necessary buffer sizes within the metropolitan area network to be easily determined using techniques that are well known to those of ordinary skill in the network design art, e.g., queuing theory.

Figure 10:
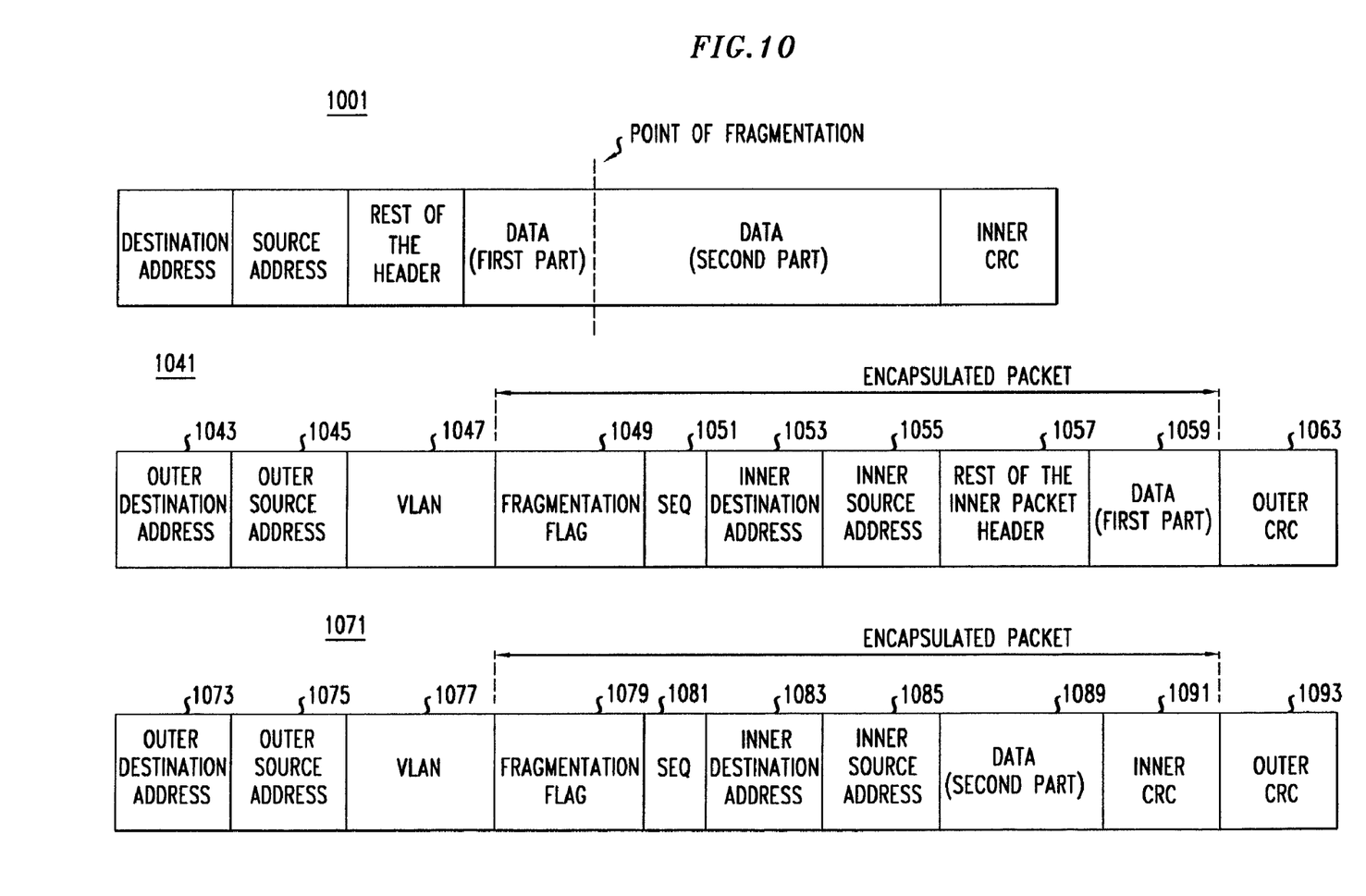
FIG. 10 shows an exemplary inner packet which is too long to be encapsulated in a single encapsulating packet, along with the format of two packets into which the too long inner packet is encapsulated.

FIG. 10 shows inner packet 1001, which is too long to be encapsulated in a single encapsulating packet, along with packets 1041 and 1071 into which it is encapsulated. With regard to packets 1041 and 1071, FIG. 10 only shows the portions of the respective packets that are of interest herein. Those standard portions of the packet which are well known to those of ordinary skill in the art and are not of interest with respect to the invention have been omitted for clarity purposes. Although FIG. 10 is essentially self-explanatory given the description of fragmentation hereinabove, a few items should be noted. First, respective fragmentation flag fields 1049 and 1079 of packets 1041 and 1071 are both set to indicate that they contain only a portion of an inner packet that has been fragmented. Second, the values of sequence numbers 1051 and 1081 differ by one. Third, note that in the embodiment of the invention shown in FIG. 10, unlike packet 901 (FIG. 9) and packet 1071 (FIG. 10) packet 1041 does not have an inner CRC field, although other embodiments in which the inner CRC maybe replicated are possible. Fourth, the value of inner destination address fields 1053 and 1083 are same, as are the values of inner source address fields 1055 and 1085.

When the test result in step 229 is NO, or after completing step 231, control passes to conditional branch 235, which tests to determine if the inner source address is currently stored in a table entry in the edge switch for the entity of the encapsulating packet ID. The inner source address is stored, as described hereinbelow, when the workstation with the inner source address has previously sent a packet from a port assigned to the entity. If the test result in step 235 is YES, indicating that the inner source address is currently stored in a table entry in the edge switch for the entity ID, control passes to step 237, in which the table entry is refreshed. To this end, the inner source address is associated with the current outer source address, determined based on the port at which the inner packet arrived, and the entity ID, by being stored in the table for the indicated entity, and the aging value, e.g., a time stamp, is reset.

If the test result in step 235 is NO, control passes to step 239, in which a new table entry is created in the table of the indicated entity to associate the inner source address with the outer source address, determined based on the port at which the inner packet arrived, and the entity ID. An aging value, e.g., timestamp, is also set for the table entry.

Upon conclusion of steps 237 or 239 control passes to step 241 in which the process is exited. At this point the outer packet is fully prepared, the learning of address association has been completed, and the outer packet may now be transmitted via the Metropolitan Ethernet network in the conventional manner of Ethernet packets.

Figure 8:
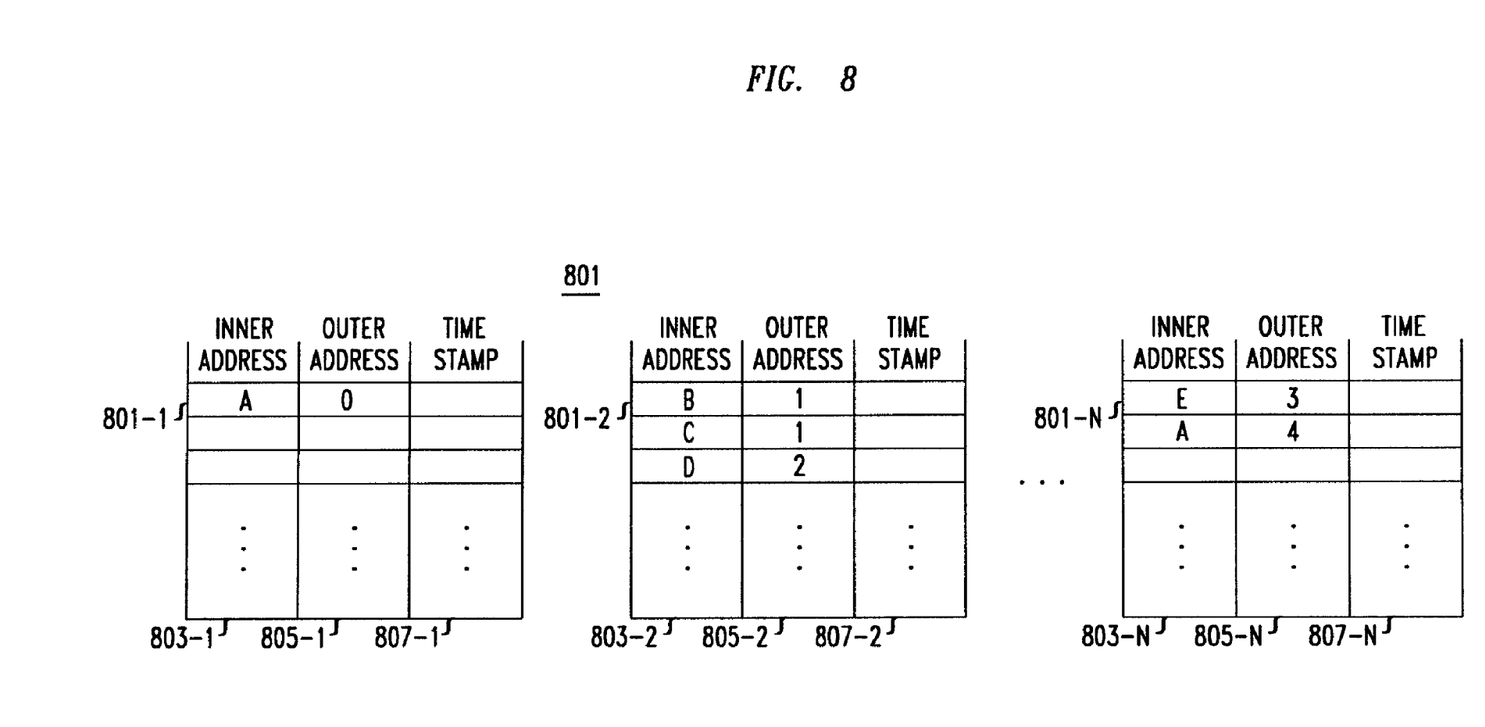
FIG. 8 shows an exemplary set of tables for use by an edge switch of FIG. 1 for processing ingress inner packets in accordance with an aspect of the invention.

FIG. 8 shows an exemplary set of tables 801, including tables 800-1 through 800-N, for use by an edge switch for processing ingress inner packets in accordance with an aspect of the invention. Each of tables 801 is associated with, and used for processing packets originated by, one of the entities served by the edge switch. Each of tables 801 includes a respective column 803 for storing inner address, a respective column 805 for storing outer address, and a respective column 807 for storing an aging value, e.g., a time stamp. Entries on the same line in each of tables 801 are associated together.

The values shown in FIG. 8 are for pedagogical purposes only and have been simplified for representational effect and are not intended to reflect actual addresses or information that would be recorded in actual practice of the invention. For the entity having entity ID 1, which employs table 801-1, it is shown that there is an association between a workstation having an Ethernet address A that was received at the edge switch on its port whose Ethernet address is 0. For the entity having entity ID 2, which employs table 801-2, it is shown that there are associations between a) a workstation having an Ethernet address B that was received at the edge switch on a port whose Ethernet address is 1, b) a workstation having an Ethernet address C that was received at the edge switch on port whose Ethernet address is 1, and c) a workstation having an Ethernet address D that was received at the edge switch on a port whose Ethernet address is 2. Similarly, for the entity having entity ID N, which employs table 801-N, it is shown that there are associations between a) a workstation having an Ethernet address E that was received at the edge switch on a port whose Ethernet address is 3 and b) a workstation having an Ethernet address A that was received at the edge switch on a port whose Ethernet address is 4. Note that the entry of A in the tables for both entity 1 and entity N should normally not occur. This is because Ethernet addresses of the workstations are supposed to be unique. Nevertheless, should such duplicative entries occur, either due to transitional occurrences or malicious activity, they will not prevent the edge switch from properly operating because the various occurrences are isolated by entity ID.

Note that the tables shown in FIG. 8 are populated both for received inner packets, as described hereinabove, as well as for received outer packets from metropolitan area Ethernet, as described hereinbelow.

Referring back to FIG. 2, if the test result in step 209 is NO, indicating that the packet is an egress packet, control passes to conditional branch point 243, which tests to determine if the entity from which the packet originated, indicated by the VLAN tag, is served by the receiving edge switch. If the test result in step 243 is NO, indicating that the receiving edge switch does not serve the entity, control passes to step 245 in which the packet is dropped. The process then exits in step 241.

If the result in step 243 is YES, indicating that the receiving edge switch does serve the entity, control passes to conditional branch point 247, which tests to determine if the inner source address is currently stored in a table entry in the edge switch for the entity ID. The inner source address is stored when the workstation with the inner source address has previously sent a packet from a port assigned to the entity to a workstation that is connected to one of the ports of the receiving edge switch. If the test result in step 247 is YES, indicating that the inner source address is currently stored in a table entry in the edge switch for the determined entity ID, control passes to step 249, in which the table entry is refreshed. To this end, the inner source address is associated with the current outer source address, determined based on the port at which the inner packet arrived, and the entity ID, by being stored in the table of the receiving edge switch for the indicated entity, and the aging value, e.g., a time stamp, is reset.

If the test result in step 247 is NO, control passes to step 251, in which a new table entry is created in the table of the indicated entity to associate the inner source address with the outer source address of the received encapsulating packet, and the entity ID. An aging value, e.g., timestamp, is also set for the table entry.

Upon completion of step 249 or step 251 control passes to conditional branch point 253, which tests to determine if the received packet was a fragmented packet, i.e., it contains only a portion of an entire inner packet. If the test result in step 253 is NO, indicating that the outer packet contains an entire inner packet, control passes to step 255, which tests to determine the type of the outer address of the received packet.

If the test result in step 255 is that the received encapsulating packet is a unicast packet, because the encapsulating edge switch had a table entry for the inner destination address in its source address column 803 (FIG. 8), control passes to step 257 (FIG. 6) in which the receiving edge switch transmits the inner packet via the port specified by the outer destination address.

If the test result in step 255 is that the received encapsulating packet is a broadcast packet, because a) the encapsulating edge switch did not have a table entry for the inner destination address in its source address column 803 (FIG. 8), b) because the inner packet was specified by its transmitter to be a broadcast packet, or c) because the inner packet was specified by its transmitter to be a multicast packet, control passes to step 259, in which the receiving edge switch transmits the inner packet to each of its ports that corresponds to the entity ID of the outer packet.

If the test result in step 255 is that the received encapsulating packet is a multicast packet, which occurs when the core switches of metropolitan area Ethernet do not support VLAN, and either there was no table entry for the inner destination address in its source address column 803 (FIG. 8) or the inner packet was specified by its transmitter to be a broadcast or multicast packet, control passes to step 261, in which the packet is transmitted to each port that is a member of the multicast group that has been previously administered to correspond to the multicast address.

The process then exits in step 241 after completion of steps 257, 259 or 261.

If the test result in step 253 is YES, indicating that the received packet was a fragmented packet, control passes to step 263, which tests to determine if a packet with the same upper bits of the sequence number has already been received. If the test result in step 263 is NO, indicating that this is the first packet of the sequence to have been received, control passes to step 265 in which at least the inner packet and at least the sequence number, and the outer source and destination addresses are stored for later use when the rest of inner packet is received in another fragmented packet or until a preset time expires. Control then passes to step 241 and the process is exited.

If the test result in step 263 is YES, indicating that this is not the first packet of the sequence to have been received, control passes to step 267 which tests to determine if both fragments have been received, e.g., two packets with the same sequence number differing only by the least significant bit and the same inner and outer source and destination addresses. If the test result in step 267 is NO, which is rare, and sometimes an abnormal event, but which must be accounted for to have a robust system, control passes to step 269 in which the older fragment is dropped. Control then passes to step 265 and the process continues as described above.

If the test result in step 267 is YES, indicating that both halves of the inner packet have been received, control passes to step 271 in which the inner packet is reconstructed from the two outer packets. In accordance with an aspect of the invention, the order in which the fragments are reconstructed may be based on the least significant bit of the sequence number. Optionally, conditional branch point 273 tests to determine if the CRC of the inner packet as reconstructed is correct. If the test result in step 273 is YES, control passes to step 255 and the process continues as described above. If the test result in step 273 is NO, control is passed to step 275 in which the packet is dropped. The process the then exits in step 241.

Advantageously, the encapsulation arrangement makes it easy to identify which entity site is the source of any packet and which entity site is the destination of any packet in the metropolitan area Ethernet network. The ability to easily identify the source and/or destination entity site of any packet makes it easy to obtain the information necessary to perform accounting functions, e.g., billing. For example, the information may be directly extracted from packets that are traversing the metropolitan area Ethernet. Furthermore, the ability to easily identify the source and/or destination entity site of a packet also makes it easy to enforce any quality of service (QoS) parameters, e.g., bandwidth, priority, and the like, which may be established, e.g., on a per-entity basis, on a per-originating-location basis, on a per-destination-location basis and/or on a paired source and destination location basis.

What is claimed is:

1. A method for use in packet communication, comprising the steps of:
   encapsulating contents of a first Ethernet packet received at a port of a switch of a metropolitan area Ethernet network in at least one encapsulating Ethernet packet that is to traverse said metropolitan area Ethernet network; and
   assigning the source address of said at least one encapsulating Ethernet packet to be the address of said port at which said packet was received.

2. The invention as defined in claim 1 wherein said contents of said first Ethernet packet is the entirety of said first Ethernet packet.

3. The invention as defined in claim 1 wherein said contents of said first Ethernet packet is a portion of said first Ethernet packet.

4. The invention as defined in claim 1 wherein said encapsulating and assigning steps are performed in an Ethernet switch of said metropolitan area Ethernet network at an interface between said metropolitan area Ethernet network and another Ethernet network.

5. The invention as defined in claim 1 wherein aid encapsulating and assigning steps are performed in an Ethernet switch of said metropolitan area Ethernet network at an interface between said metropolitan area Ethernet network, which serves a plurality of entities, and another Ethernet network, which serves only a single one of said entities.

6. The invention as defined in claim 1 further including the step of incorporating in said at least one encapsulating Ethernet packet a entity identifier which is a function of said address of said port at which said packet was received.

7. The invention as defined in claim 6 wherein said entity identifier is a virtual local area network (VLAN) tag.

8. The invention as defined in claim 1 wherein said encapsulating step is performed so that a first portion of said first Ethernet packet is encapsulated in said at least one encapsulating Ethernet packet and a second portion of said first Ethernet packet is encapsulated in at least a second encapsulating Ethernet packet that is to traverse said metropolitan area Ethernet network, the method further including the step of:
   assigning the source address of said second encapsulating Ethernet packet to be the address of said port at which said packet was received.

9. The invention as defined in claim 1 further including the step of:

assigning said at least one encapsulating packet a destination address as a function of a stored association between the destination address of said first Ethernet packet and a destination address for said metropolitan area Ethernet network of a previously received Ethernet packet from said metropolitan area Ethernet network.

10. The invention as defined in claim 1 further including the step of:
assigning said at least one encapsulating packet a destination address as a function of a stored association between the destination address of said first Ethernet packet and a port of said metropolitan area Ethernet network.

11. The invention as defined in claim 1 further including the step of:
assigning said at least one encapsulating packet as at least one type from a set of types consisting of a broadcast packet and a multicast packet.

12. The invention as defined in claim 11 wherein said step of assigning said at least one encapsulating packet as a broadcast packet is performed when said first packet is a broadcast or a multicast packet.

13. The invention as defined in claim 11 wherein said step of assigning said at least one encapsulating packet as a broadcast packet is performed when there is no stored association between the destination address of said first Ethernet packet and a destination address for said metropolitan area Ethernet network of a previously received packet from said metropolitan area Ethernet network.

14. The invention as defined in claim 1 wherein said metropolitan area Ethernet network supports virtual local area network (VLAN) tags, and wherein said first Ethernet packet is a broadcast or multicast packet, the method further comprising the step of:
incorporating an entity identifier which is a function of said address of said port at which said first Ethernet packet was received as a VLAN tag in said encapsulating packet; and
assigning said at least one encapsulating packet as a broadcast packet.

15. An edge switch for use in a metropolitan area Ethernet network having ports adapted to be coupled to at least one local area Ethernet network, said edge switch comprising:
at least one port for receiving inner Ethernet packets from at least one of said local area Ethernet networks and for transmitting inner Ethernet packets of said at least one of said local area Ethernet networks, said at least one port being one of said ports of said metropolitan area Ethernet network;
a memory for establishing a correspondence association between addresses within said at least one local area Ethernet network and addresses of said ports in said metropolitan area Ethernet network; and
an encapsulator that embeds each of said received inner packets as a payload in at least one encapsulating packet and places the address of said at least one port within the source address field of said at least one encapsulating packet.

16. The invention as defined in claim 15 wherein given an address of a particular one of said addresses within said at least one local area Ethernet network said switch is operable to retrieve said corresponding associated one of said addresses of said ports in said metropolitan area Ethernet network.

17. The invention as defined in claim 15 wherein said memory further associates a time stamp with each said associated address within said at least one local area Ethernet network and address of said ports in said metropolitan area Ethernet network.

18. The invention as defined in claim 15 further comprising a virtual local area network (VLAN) tag marker.

19. The invention as defined in claim 15 further comprising a memory associating said at least one port of said metropolitan area Ethernet with an entity.

20. The invention as defined in claim 15 further comprising a packet stripper that extracts said inner Ethernet packets from encapsulating packets for transmission to said local area Ethernet via said port.

21. The invention as defined in claim 15 further comprising:
a packet stripper that extracts at least a respective portion of a one of said inner packets from at least two different encapsulating packets; and
an inner packet reassembler that receives said portions of said inner packet from said packet stripper and reconstructs therefrom said one of said inner packets.

22. The invention as defined in claim 15 further comprising:
a memory writer for forming an association in said memory between a received encapsulating packet's source address and a source address of an inner packet within said encapsulating packet.

23. The invention as defined in claim 15 wherein said encapsulator further places within the destination address field of said at least one encapsulating packet an address of said metropolitan area Ethernet network that is associated within said memory with a destination address of said inner packet.

24. The invention as defined in claim 15 wherein said encapsulator further places within the destination address field of said at least one encapsulating packet an indication that said encapsulating packet is a multicast packet when there is no address of said metropolitan area Ethernet network associated within said memory with a destination address of said inner packet.

25. The invention as defined in claim 15 wherein said encapsulator further places within the destination address field of said at least one encapsulating packet an indication that said encapsulating packet is a broadcast packet when there is no address of said metropolitan area Ethernet network associated within said memory with a destination address of said inner packet.

26. The invention as defined in claim 15 further comprising:
a virtual local area network (VLAN) tag marker; and
wherein said encapsulator further places within the destination address field of said at least one encapsulating packet an indication that said encapsulating packet is a broadcast packet when there is no address of said metropolitan area Ethernet network associated within said memory with a destination address of said inner packet, and said VLAN tag marker marks said encapsulating packet with a VLAN tag corresponding to an entity associated with said port at which said inner packet was received.

27. Program code in computer readable medium for use in processing Ethernet packets, said computer readable program code comprising:
a module for encapsulating contents of a first Ethernet packet received at a port of a metropolitan area Ethernet network in at least one encapsulating Ethernet packet that is to traverse said metropolitan area Ethernet network; and a module for assigning the source address of said at least one encapsulating Ethernet packet to be the address of said port at which said first Ethernet packet was received.

28. Apparatus for use in providing metropolitan area Ethernet service, comprising:
means for encapsulating contents of a first Ethernet packet received at a port of a metropolitan area Ethernet network in at least one encapsulating Ethernet packet that is to traverse said metropolitan area Ethernet network; and
means for assigning the source address of said first Ethernet at least one encapsulating Ethernet packet to be the address of said port at which said packet was received.

29. A metropolitan area Ethernet network, said metropolitan area Ethernet network comprising:
a plurality of edge switches, each of said edge switches being coupled to at least one of a plurality of local area networks (LANs) at ports of said edge switches, wherein, said edge switches encapsulate contents of inner Ethernet packets received from said LANs into at least one encapsulating Ethernet packet, said encapsulating Ethernet packet employing as a source address an address of a one or said ports of said edge switch at which its encapsulated inner Ethernet packet was received; and
at least one core switch for switching said encapsulating Ethernet packets;
wherein each of said plurality of edge switches is coupled to said at least one of said core switches.

30. A method for use in packet communication, comprising the steps of:
dividing a first Ethernet packet having a source address and a destination address that is received at a port of a metropolitan area Ethernet network into first and second parts, said first and second parts being taken from portions of said first Ethernet packet exclusive of said source address and said destination address;
encapsulating said first and second parts in at least two respective encapsulating Ethernet packets that are to traverse said metropolitan area Ethernet network;
assigning the source address of each of said encapsulating Ethernet packets to be the address of said port at which said first packet was received;
assigning the source address of said first Ethernet packet as an inner source address of each of said encapsulating packets; and
assigning the destination address of said first Ethernet packet as an inner destination address of each of said encapsulating packets.

31. The invention as defined in claim 30 wherein first and second parts taken from portions of said first packet are divided at a point that is a function of a random number generator with a prescribed distribution.

32. A method for use in packet communication, comprising the steps of:
receiving at least first and second encapsulating packets at edge switch of a metropolitan area Ethernet network, each of said encapsulating packets containing a portion of data and/or cyclic redundancy check of a first inner packet that was fragmented into at least first and second encapsulating packets for transport via said metropolitan area Ethernet network; and
reassembling said first inner packet using said portions of data and/or cyclic redundancy check contained within said first and second encapsulating packets;
wherein said first inner packet contained a source address and a destination address and each of said encapsulating packet further contains said source address and said destination address of said first inner packet.

33. A method for use in packet communication comprising the steps of:
encapsulating a first portion of an inner Ethernet packet received at a port of a metropolitan area Ethernet network into a first encapsulating Ethernet packet;
encapsulating a second portion of said inner Ethernet packet into a second encapsulating Ethernet packet when said first encapsulating Ethernet packet would exceed a prescribed Ethernet maximum packet length if said first portion was the entirety of said inner Ethernet packet; and
assigning the source address of said first encapsulating Ethernet packet to be the address of said port at which said packet was received.

34. The invention as defined in claim 33 further comprising the step of assigning the source address of said second encapsulating Ethernet packet to be the address of said port at which said packet was received when said first encapsulating Ethernet packet would exceed said prescribed Ethernet maximum packet length if said first portion was the entirety of said inner Ethernet packet.

35. The invention as defined in claim 34 further comprising the steps of;
assigning a first sequence number to said first encapsulating Ethernet packet; and
assigning a second sequence number different from said first sequence number to said first encapsulating Ethernet packet.

36. The invention as defined in claim 34 wherein the length of said first portion and the length of said portion is selected so that said first and second encapsulating packets conform to a prescribed distribution for lengths of encapsulating packets.

* * * * *